United States Patent [19]

Konuma et al.

[11] Patent Number: 5,357,356
[45] Date of Patent: Oct. 18, 1994

[54] ELECTRO-OPTICAL DEVICE AND METHOD FOR FORMING THE SAME

[75] Inventors: Toshimitsu Konuma; Takeshi Nishi; Michio Shimizu; Kouji Moriya, all of Kanagawa, Japan

[73] Assignee: Semiconductor Energy Laboratory Co., Ltd., Kanagawa, Japan

[21] Appl. No.: 996,408

[22] Filed: Dec. 23, 1992

[30] Foreign Application Priority Data

Dec. 27, 1991 [JP] Japan ................. 3-360117

[51] Int. Cl.$^5$ ................................. G02F 1/13
[52] U.S. Cl. ............................. 359/52; 359/51
[58] Field of Search ......................... 359/51, 52

[56] References Cited

U.S. PATENT DOCUMENTS

| | | | |
|---|---|---|---|
| 4,728,547 | 3/1988 | Vaz et al. | 359/51 |
| 4,834,509 | 5/1989 | Gunjima et al. | 359/52 |
| 5,011,624 | 4/1991 | Yamagishi et al. | 359/52 |
| 5,084,203 | 1/1992 | Sansone et al. | 359/51 |
| 5,096,282 | 3/1992 | Margerum et al. | 359/51 |
| 5,204,763 | 4/1993 | Hikmet | 359/51 |

*Primary Examiner*—Anita P. Gross
*Attorney, Agent, or Firm*—Sixbey, Friedman, Leedom & Ferguson

[57] ABSTRACT

A process for fabricating a polymer-dispersed liquid crystal electro-optical device, which comprises: placing a mixture of a liquid crystal material having anisotropy in refractive index and a photocurable resin on a substrate equipped with an electrode; and curing the resin by irradiating a light to said mixture; wherein, said light has such a wavelength distribution that it covers the peak of light absorption of the portion which undergoes photo-curing reaction in said photocurable resin, provided that 90% or more of said light is distributed within a wavelength range ±20 nm from the wavelength of said light absorption peak of the resin.

23 Claims, 6 Drawing Sheets

ELECTRO-OPTICAL DEVICE AND METHOD FOR FORMING THE SAME

BACKGROUND OF THE INVENTION

1. Field of the Invention

The present invention relates to a polymer-dispersed liquid crystal (PDLC) electro-optical device comprising an electro-optical modulating layer composed of a photocurable resin and a liquid crystal material.

2. Prior Art

Liquid crystal displays are now replacing conventional display devices such as televisions equipped with cathode ray tubes (CRTs), because liquid crystal displays are thinner, compact, light weight, and consume low power. Liquid crystal displays operating in an STN (super twisted nematic) type mode and a TN (twisted nematic) type mode have now been developing. Also, their use have extended widely from watches to the field of word processors and liquid crystal television sets.

However, it is indispensable in those displays to incorporate one or two polarizer sheets in the liquid crystal cell. Because the light transmittance per polarizer sheet is as low as in the range of from 40 to 50%, the light transmittance of a TN type display using the polarizer sheet(s) as a result falls to a low 10 to 30% even in the bright state (the state of transmitting light). Accordingly, an additional backlighting is requisite to compensate for the optical loss to lighten the dark display.

Recently, polymer-dispersed liquid crystals free from the aforementioned polarizer sheets and which provide bright displays of high contrast images are studied more extensively. This type of liquid crystal comprises an electro-optical modulating layer based on a light-transmitting solid phase polymer having dispersed therein granular or sponge-like nematic, cholesteric, or smectic liquid crystal materials. A known process for fabricating an electro-optical device of this type comprises dispersing liquid crystals in a polymer by encapsulating the liquid crystal, and then establishing the polymer as a thin film on a film or a substrate. Proposed materials for encapsulating the liquid crystal include gelatin, gum arabic, and poly(vinyl alcohol).

For instance, liquid crystal molecules being encapsulated in poly(vinyl alcohol) and having a positive dielectric anisotropy arrange themselves along a single direction on applying an external electric field, in such a manner that the molecules orient their major axes along the direction parallel to the direction of the electric field. If the refractive index of the oriented liquid crystal molecules is equal to that of the polymer, a light can pass straight forward through this portion. Hence, in this case, light can be transmitted through this portion. If no external electric field is applied to the liquid crystal, the liquid crystal molecules do not take a particular arrangement but the major axes thereof yield a random orientation. Accordingly, the refractive index of the polymer becomes different from that of the liquid crystal. Thus, in this case, a light passing through this portion is scattered that the liquid crystal exhibits an opaque (milky white) appearance. The PDLC electro-optical device fabricated in the manner described above yield a transmittance as high as 90% at the 'ON' state and several percents at the 'OFF' state. It can be seen that a very bright display is obtained.

PDLC electro-optical devices are not only confined to those comprising encapsulated liquid crystals as described above, but also various others of this type are known to the present. PDLC electro-optical devices include those comprising an electro-optical modulating layer which takes advantage of, for example, an epoxy resin having dispersed therein liquid crystals, a phase separation between the liquid crystal and a photocurable resin, and a three-dimensionally connected polymer having impregnated with liquid crystal. All those are collectively referred to as PDLC electro-optical device in the present invention.

PDLC electro-optical devices most commonly used at present are those based on phase separation. The key in fabricating those liquid crystal electro-optical devices is the selection of the liquid crystal and the photocurable resin. To obtain a high transmittance in the light transmitting mode of a PDLC electro-optical device using a liquid crystal having a positive dielectric anisotropy on applying an electric field to the electro-optical modulating layer, the liquid crystal material and the resin matrix must be selected as such that the refractive index of the resin matrix be as equal as possible to the refractive index for the ordinary light of the liquid crystal material. In this manner the difference in refractive indices between the dispersed liquid crystal particles and the resin matrix surrounding the particles can be minimized. On the other hand, the scattering characteristics at the unpowered state (with no electric field being applied) can be ameliorated by using a liquid crystal material having a large birefringence (referred to simply hereinafter as $\Delta n$).

These points are different from those for a TN liquid crystal. A liquid crystal electro-optical device operating in a TN mode takes advantage of the optical rotatory power of the liquid crystal. Accordingly, a liquid crystal material having a small anisotropy in refractive index is desired in the TN mode devices in order to make the color unevenness unperceivable even with low uniformity of cell thickness. In practice, materials having a $\Delta n$ of 0.1 or lower are used. In contrast, nematic liquid crystals used in the PDLCs yield $\Delta n$ in the range of from about 0.2 to 0.28. Such materials with large $\Delta n$ values are mostly obtained by blending, for example, liquid crystals based on Schiff's base, pyrimidines, and materials having cyano groups, double bonds, or triple bonds.

The liquid crystal material and the matrix resin having selected by taking the aforementioned points in account are generally mixed at the former to the latter ratio in the range of 4:6 to 8:2. With increasing the addition of the resin into the mixed liquid, the mixture tends to undergo phase transition from an isotropic phase to a nematic phase at a lower temperature. Furthermore, the solution becomes more liable to separate into a resin and a liquid crystal with the precipitation of the liquid crystal phase. The solution cannot be handled with accuracy because of the separation. The separation is not favorable because it becomes difficult to mix the resin and the liquid crystal material at a predetermined ratio. Accordingly, the phase transition temperature preferably is not higher than room temperature.

In the fabrication process, electrodes are patterned to establish the electrodes on the substrates. Then, two substrates are superposed in such a manner that the patterned electrodes may face each other, and that a predetermined distance is maintained therebetween. Then, the aforementioned mixed solution is injected into the empty cell thus obtained with a fixed spacing.

The UV curable resin must be cured by a UV irradiation to finish it into a PDLC. The liquid crystal and the resin then undergo phase separation with curing, and a network structure develops as a whole in such a manner that the droplets of the liquid crystal are surrounded by the resin. At this point, the electro-optical modulating layer turns milky white to provide a light scattering state.

However, cells having fabricated by the process described above often yield poor voltage-light transmittance properties. A reason for this is the degradation of the liquid crystal materials by UV irradiation. This is supported by the fact that degradation is clearly observed on a liquid crystal having subjected to UV irradiation in such a manner that only the liquid crystal is irradiated with UV light in a process similar to that of the fabrication of a PDLC. This is ascribed to the fact that the nematic liquid crystals usually contain, as mentioned hereinbefore, a liquid crystal material based on a Schiff's base, a pyrimidine-based liquid crystal material, or a material containing a cyano group, a double bond, or a triple bond. Such materials are liable to decomposition on absorbing light in the wavelength region of 400 nm or shorter. Thus, it can be seen that the UV irradiation indispensable for curing the resin adversely degrades the liquid crystal. Accordingly, no favorable characteristics can be obtained on a liquid crystal electro-optical device fabricated by a conventional process.

In a conventional process for fabricating a PDLC electro-optical device, a UV light is irradiated to a mixed solution containing both the liquid crystal material having a large anisotropy in refractive index and the UV curable resin to thereby obtain liquid crystal droplets being dispersed in a cured resin matrix. Accordingly, the UV light is irradiated not only to the resin matrix but also to the liquid crystal material. This inevitably accelerates degradation of the liquid crystal. On second thought, however, this signifies that an excessively strong UV light need not be irradiated to the mixed solution. A light necessary and sufficient for accelerating the curing of the resin must be irradiated.

SUMMARY OF THE INVENTION

Accordingly, the present invention was accomplished by taking the foregoing findings into consideration. That is, the present invention is characterized by a process which comprises irradiating a light to a mixture of a liquid crystal material having anisotropy in refractive index and a photocurable resin, wherein, said light has such a wavelength distribution that it covers the peak of light absorption of the portion which undergoes photo-curing reaction in said photocurable resin, provided that 90% or more of said light is distributed within a wavelength range ±20 nm from the wavelength of said light absorption peak of the resin.

DETAILED DESCRIPTION OF THE PRESENT INVENTION

The light source for use in the present invention may be a combination of a UV light source and a band pass filter designed for passing light of a particular wavelength range, or a light having a single wavelength such as a monochromatic light being emitted from a laser. A PDLC with less UV degradation can be realized by cutting off light in the unwanted wavelength region in this manner, because a light only of a specified wavelength region is irradiated simultaneously to the liquid crystal material and the resin.

The light to be irradiated to the mixture of a photocurable resin and a liquid crystal material should be such having a distribution covering the wavelength of the peak of light absorption of the portion which undergoes photo-curing reaction in the photocurable resin, provided that 90% or more of the light falls in a wavelength region ±20 nm from the wavelength of the aforementioned peak of light absorption. A light having a wider wavelength distribution comprises light components falling in unfavorable wavelength regions which may disintegrate the liquid crystal materials. Then, a severe degradation occurs on the liquid crystal material again because such a light is essentially the same as that used in a conventional process. Thus, a liquid crystal electro-optical device having no reliability is obtained as a result.

As a result of an extensive study of the present inventors, it has been found further that particularly, the irradiation of a UV light in the wavelength region of from 380 to 420 nm to a liquid crystal material causes little damage to the liquid crystal. Accordingly, by using a resin comprising a photocurable part having a light absorption peak in this wavelength region (380 nm to 420 nm) and irradiating a light having this wavelength region (380 nm to 420 nm) thereto, a PDLC suffering less UV degradation can be formed. This signifies that a PDLC having favorable voltage-light transmittance properties can be obtained as a result.

The present invention is illustrated in greater detail referring to non-limiting examples below. It should be understood, however, that the present invention is not to be construed as being limited thereto.

EXAMPLE 1

Figure 1:
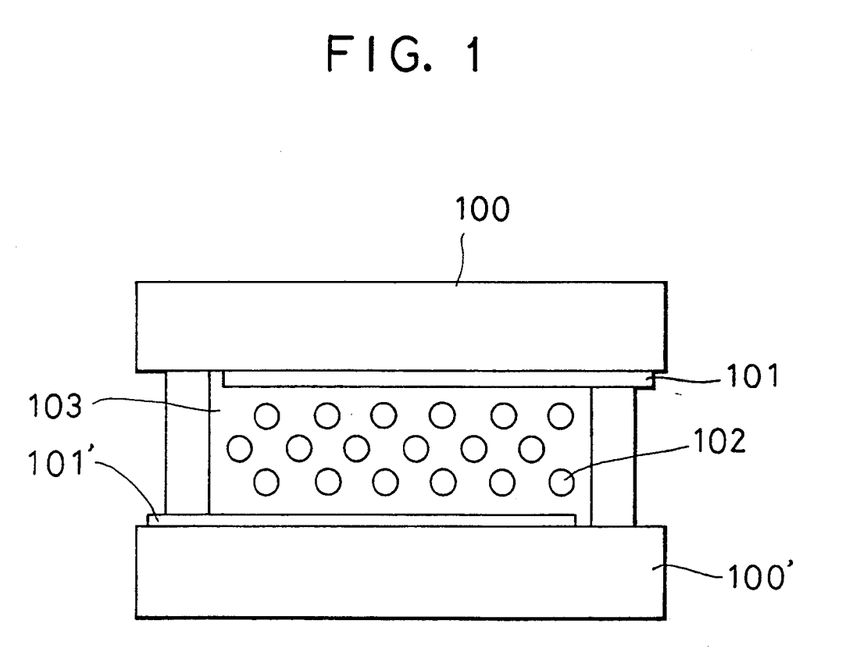
FIG. 1 shows schematically a structure of a PDLC cell.

Referring to FIG. 1, a process for fabricating a PDLC cell according to the present invention is described. Light-transmitting electrically conductive films 101 and 101' were established on light-transmitting substrates 100 and 100' by depositing, e.g., an oxide of indium and tin (ITO), zinc oxide, etc., using vapor deposition or sputtering to a thickness in the range of from 500 to 2,000 Å. In this example, an ITO film was used. The film had a sheet resistivity of from 20 to 200 $\Omega/cm^2$. The ITO film was then patterned by a conventional photolithographic process. More particularly, the ITO film was covered with a resist resin of a predetermined pattern, and the uncovered portion of the conductive film was dissolved using an etchant to obtain a substrate provided with a patterned ITO electrode thereon.

The etchant to be used in this step may be an aqueous hydrochloric acid solution, an aqueous solution of hydrochloric acid and nitric acid, or an aqueous solution of ferric chloride and hydrochloric acid. The etchant may be heated, if necessary, to about 60° C. to accelerate the reaction rate. Then, spacers (not shown in the figure) were scattered on the liquid crystal substrate thus obtained. The spacers maintain the spacing between the substrates at a constant value. Several tens of milligrams of spacers were weighed out, and were added into 50 ml of isopropyl alcohol. The dispersion thus obtained was sprayed on the substrate using a spinner or a spray to place from 10 to 200 spacers on the substrate. Then, this substrate and the other substrate were mated with a space therebetween. In this manner, a cell having a cell spacing maintained at a constant value by means of spacers was fabricated.

In order to provide an electro-optical modulating layer between the pair of substrates, a dispersion comprising a liquid crystal and a photocurable resin was injected into the space between the pair of substrates taking advantage of a capillary phenomenon or by making use of a vacuum process. The electro-optical modulating layer has a network structure which comprises numerous liquid crystal droplets 102 being surrounded by a resin 103. In this example, by irradiation of a light, BL-001 (liquid crystal material manufactured by BDH Corp.) having a refractive index (for ordinary light) of 1.521 and an anisotropy in refractive index of 0.225 was dispersed in a ultraviolet (UV) curable resin NOA065 (a product of Noland Co., Ltd.) having the same refractive index as that of the liquid crystal material (1.521) to obtain the dispersion for the electro-optical modulating layer. The liquid crystal undergoes phase transition from an isotropic phase to liquid crystal phase at 61° C.

The reaction initiator for the resin according to the present invention had a characteristic light absorption in the wavelength range of from 350 to 380 nm. Thus, the resin undergoes curing by the irradiation of a light having a wavelength falling in this wavelength region. It can be seen that the cell turns almost perfectly transparent when an electric field is applied to the cell, because the refractive index of the liquid crystal is adjusted to that of the polymer. In the scattering mode which is realized when no electric field is applied, a higher scattering can be expected by using a liquid crystal material having a larger anisotropy in the refractive index. It is therefore a key in producing a liquid crystal display that the refractive indices of the liquid crystal material and the resin are adjusted to make the best of the light transmittance in the powered state and the light scattering in the unpowered state.

Figure 2:
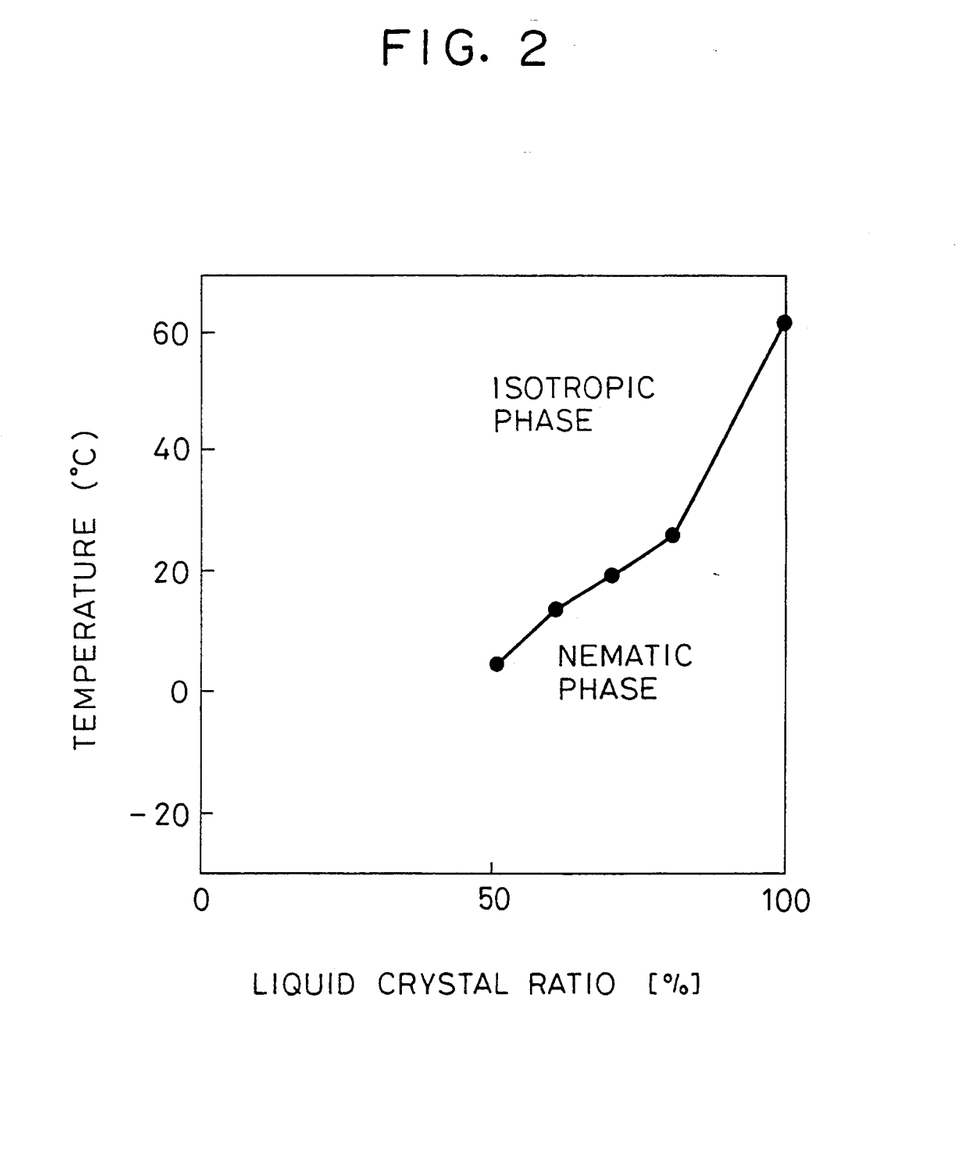
FIG. 2 shows the phase diagram of a liquid crystal material used in the Example according to the present invention.
Figure 3:
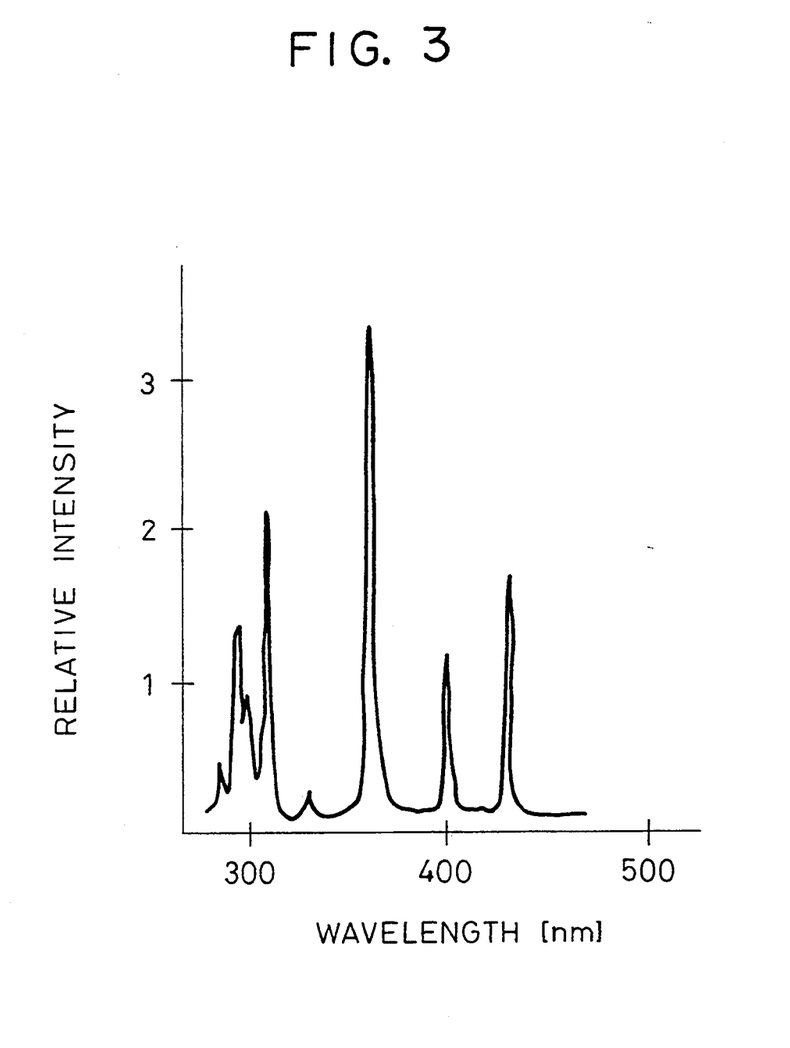
FIG. 3 is the spectrum of the light source used in the Example according to the present invention.

FIG. 2 shows the change in temperature of phase transition from an isotropic phase to a liquid crystal phase with change in the mixing ratio of the liquid crystal material and the UV curable resin. A 7:3 mixture of liquid crystal and resin undergoes phase transition at 19° C. This 7:3 mixture of liquid crystal and resin was subjected to UV irradiation to obtain an electro-optical modulating layer. A mercury/xenon lamp was used as a UV light source. Spectroscopically, this lamp yields a maximum intensity at a wavelength of 365 nm, which was accompanied with smaller peaks at a wavelength of 305 nm, 405 nm, and 436 nm. Further peaks with smaller intensities were also observed. Band pass filters corresponding to each of the output wavelengths of this light source were inserted in the optical path to observe monochromatic light having a half value width of 20 nm. In this way, monochromatic light having a half value width of 20 nm was obtained by passing through a filter a light emitted from a light source.

In the following example, a non-monochromatic light and spectrally resolved monochromatic light having each a wavelength of 313 nm, 365 nm, 405 nm, and 435 nm were used.

Figure 4:
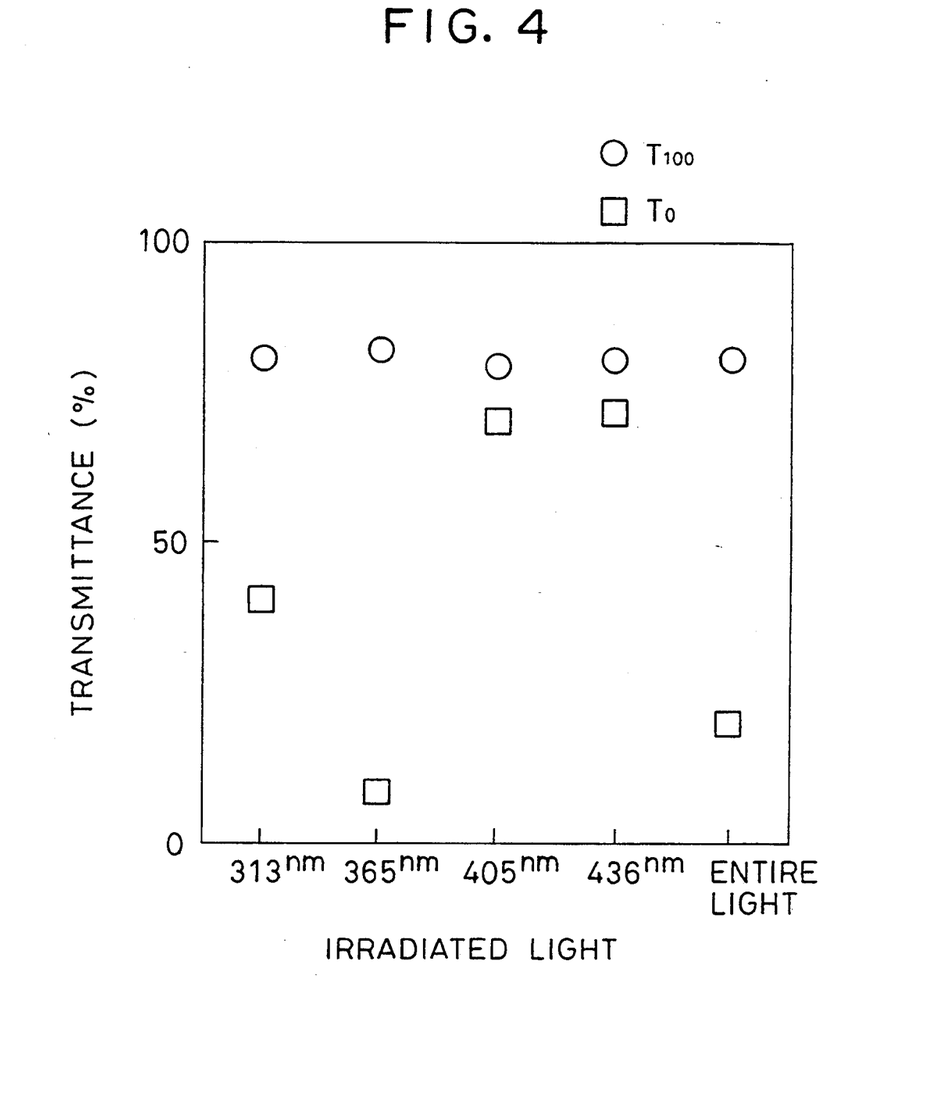
FIG. 4 shows light transmittance values for each of type of light for use in curing the resin of the liquid crystal electro-optical device.

A 7:3 mixture of a liquid crystal and a resin was injected into a cell, and was subjected to UV irradiation. The result is given in FIG. 4. The transmittance with no applied electric field is denoted as $T_0$, and the saturation transmittance under applied electric field is denoted as $T_{100}$. $T_{100}$ was found to be about 80% for all of the light, but different $T_0$'s were obtained; $T_0$ was large for light having a wavelength of 313 nm, 405 nm, and 435 nm, because the light falling in these wavelength regions have no effect on curing the resin.

Figure 5:
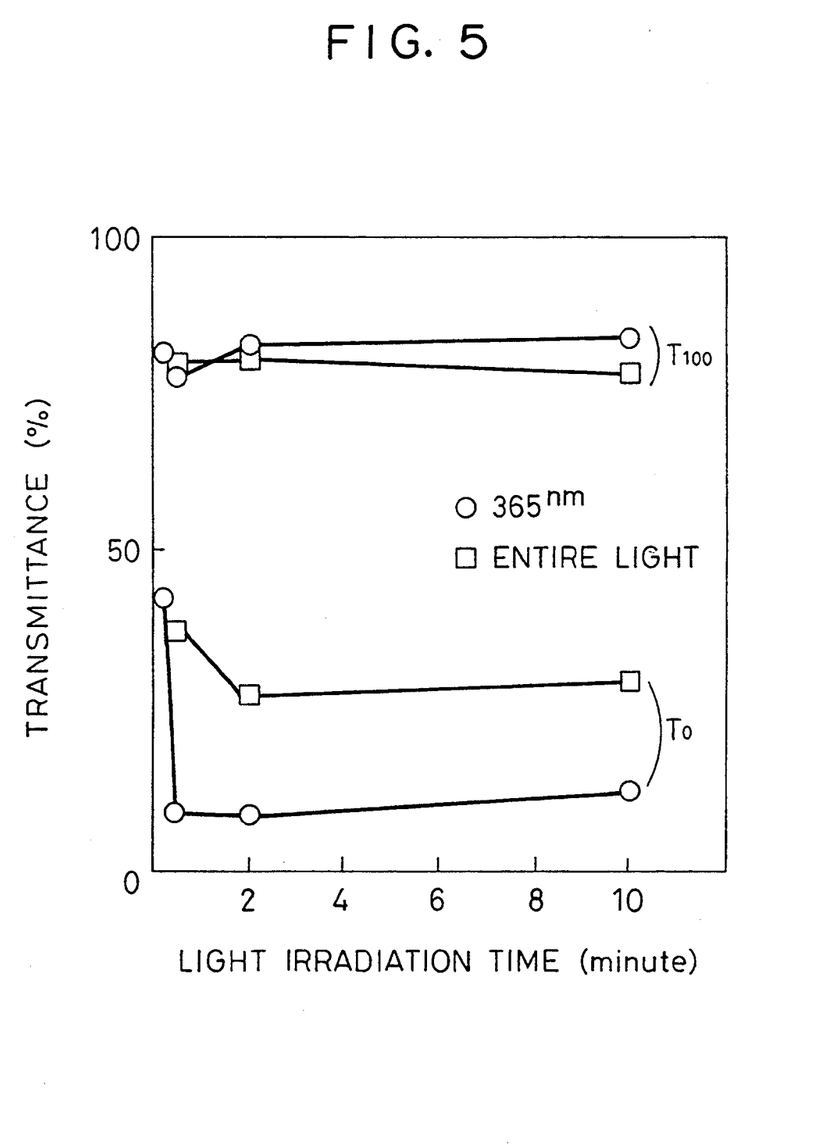
FIG. 5 shows the change of transmittance with passage of light irradiation time.

In view of the result obtained above, the change in characteristics of the liquid crystal electro-optical devices obtained by irradiating a non-monochromatic light (entire light) and a light having a peak at a wavelength of 365 nm were observed with changing the duration of irradiation. The results are given in FIG. 5. The figure reads that the transmittance $T_0$ with no electric field being applied to the cell exhibits a minimum at a specific duration of irradiation, and that it gradually increases with longer duration of irradiation. This signifies that the liquid crystal cell characteristics are gradually impaired with increasing duration of irradiation. Furthermore, it can be seen that the characteristics were all superior for the cell having fabricated by irradiating a light having a peak at the wavelength of 365 nm, as compared with that fabricated using a non-monochromatic light (entire light). This is assumably due to the fact that the non-monochromatic light (entire light) contains light of unfavorable wavelengths in addition to the light of 365 nm necessary for cuing the resin. Presumably, the light in the wavelength region other than those at the vicinity of 365 nm have unfavorable effects to deteriorate the liquid crystal material.

Figure 6:
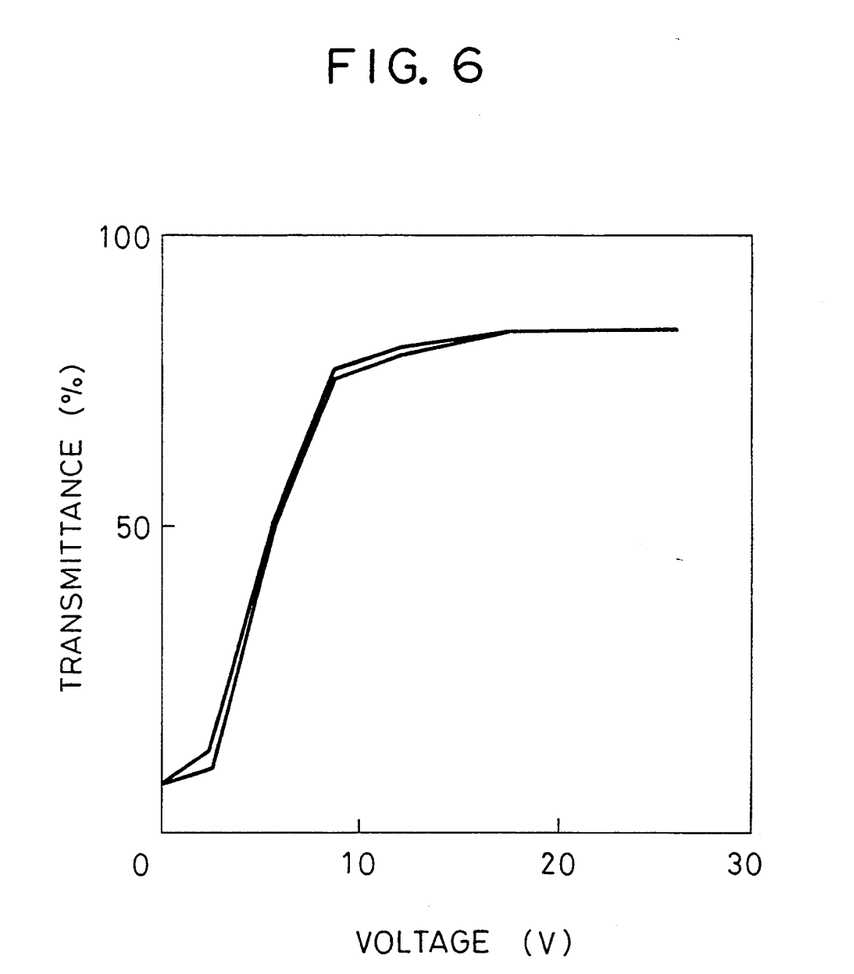
FIG. 6 shows the change of transmittance with changing driving potential of the liquid crystal electro-optical device according to the present invention.

In FIG. 6 is given the electro-optical properties of a PDLC obtained by curing the resin with a light having a peak at a wavelength of 365 nm. A very steep characteristic curve with small hysteresis is obtained. The electro-optical modulating layer was cut vertical to the substrate in a liquid nitrogen atmosphere to obtain the cross section of the liquid crystal electro-optical device. This cross section was dipped into a methanol solution for 2 to 5 minutes to extract the liquid crystal inside the droplets. The droplets were coated with gold by sputtering, and were observed under a scanning electron microscope (SEM) for the shape of the droplet. It was confirmed from the shape of the resin surrounding the liquid crystal droplets that the droplets were about 3 $\mu$m in average size and relatively uniform in shape.

EXAMPLE 2

A PDLC electro-optical device was fabricated from a mixture of a liquid crystal material and a UV-curable resin in the same manner as above, except that the resin used in the present Example comprises a photo-reactive portion having light-absorption characteristics different from the portion used in Example 1. Resin-A and Resin-B were used, where Resin-A is a resin having the peak of light absorption for photo-curing reaction at a wavelength of 313 nm, and Resin-B is such having the same peak at a wavelength of 405 nm. Accordingly, a light having a peak at 313 nm and a light having a peak at 405 nm were irradiated to Resin-A and Resin-B, respectively, using the same UV light source equipped with a band pass filter as in Example 1.

In the experiment, a PDLC and a cell comprising a nematic liquid crystal alone were subjected to UV irradiation to investigate simultaneously the degree of degradation on both of the liquid crystal materials. Then, pulses having a duration of 64 μsec were applied every 30 msec to the liquid crystal cell at a voltage of 20 V using a field-effect transistor to obtain the voltage drop of the liquid crystal electro-optical device cells from the root mean square (r.m.s.) value. In this manner, the voltage retention of the cells were obtained.

As a result, it was observed that the voltage retention of 88% before irradiating the light dropped at 49% on irradiating a light having a peak at 313 nm. Likewise, the resistivity of the system also lowered. In contrast, the drop of voltage retention was not so large on irradiating a light having a peak at 405 nm, yielding a value of 85%. This signifies that the resin is cured by irradiating a light having a peak at 405 nm, but with no progress in degradation and decomposition of the material. Accordingly, no current flow occurs in the liquid crystal material. This leads to stable retention of the applied voltage. Furthermore, superior optical properties were obtained on the PDLC electro-optical device using Resin-B as compared with those of the PDLC electro-optical device using Resin-A, yielding a lower $T_0$, a steeper voltage-light transmittance curve, and favorable results on reliability tests.

Similarly, light in the wavelength region of from 380 to 420 nm was obtained by changing the band pass filter to carry out examinations following the processes described above. Again, a stable liquid crystal electro-optical device having less deterioration of the liquid crystal material was realized as in the case using the light having a peak at a wavelength of 405 nm.

The liquid crystal electro-optical devices in the examples described above comprise each a pair of substrates. However, the application of the process for fabricating a liquid crystal electro-optical device according to the present invention is not only confined to this structure. For example, the process according to the present invention can be applied to a liquid crystal electro-optical device comprising a single substrate. In this case, the process comprises providing a mixture comprising a resin material (e.g. a photocurable resin) and a liquid crystal material on one substrate by printing, coating, dipping, or any other method to give an electro-optical modulating layer comprising the liquid crystal and the resin on said one substrate having provided thereon a first electrode; irradiating said mixture with a light to harden the resin (the photocurable resin) with a light absorption peak wavelength of a reaction initiator constituting the resin (photocurable resin) by said light; and then depositing directly thereon a second electrode by a process such as vapor deposition and sputtering. The resulting structure may be further coated with a protection film e.g. on the second electrode, if necessary, to obtain the liquid crystal electro-optical device in a completed form.

It can be seen from the foregoing description that the present invention provides a process for fabricating a PDLC electro-optical device having stable and favorable electro-optical characteristics by preventing degradation due to UV irradiation from occurring on liquid crystal materials. The process for fabricating a PDLC device comprising a liquid crystal material and a UV-curable resin according to the present invention comprises using as the UV source for curing the resin, a light having a specific wavelength corresponding to the absorption wavelength of the photoreactive portion of the resin, provided that the resin is selected as such that it comprises a photoreactive portion that absorbs only light of a wavelength which causes no damage to the liquid crystal.

While the invention has been described in detail and with reference to specific embodiments thereof, it will be apparent to one skilled in the art that various changes and modifications can be made therein without departing from the spirit and scope thereof.

What is claimed is:

1. A method for forming an electro-optical device comprising the steps of:
   providing a mixture comprising a liquid crystal and a photocurable resin on a substrate; and
   irradiating said mixture with a light to harden said photocurable resin, the reaction initiator for said photocurable resin having a characteristic light absorption peak wavelength,
   wherein said light absorption peak wavelength minus 20 nm to said light absorption peak wavelength plus 20 nm accounts for 90% or more of said light.

2. The method of claim 1 wherein said light is obtained by passing through a filter a light emitted from a light source.

3. The method of claim 1 wherein said light comprises a light having a single wavelength.

4. The method of claim 3 wherein said light having a single wavelength is a laser light.

5. The method of claim 1 wherein said liquid crystal is dispersed in said photocurable resin by the irradiation of said light.

6. The method of claim 1 wherein said light absorption peak wavelength minus 20 nm to said light absorption peak wavelength plus 20 nm is 380 nm to 420 nm.

7. The method of claim 1 further comprising the steps of:
   forming an electrode on the mixture; and
   forming a protection film on said electrode.

8. The method of claim 1 wherein said substrate is provided with an electrode thereon.

9. A method for forming an electro-optical device comprising the steps of:
   mating a pair of substrates with a space therebetween;
   introducing a mixture comprising a liquid crystal and a photocurable resin into said space; and
   irradiating said mixture with a light to harden said photocurable resin, the reaction initiator for said photocurable resin having a characteristic light absorption peak wavelength,
   wherein said light absorption peak wavelength minus 20 nm to said light absorption peak wavelength plus 20 nm accounts for 90% or more of said light.

10. The method of claim 9 wherein said light is obtained by passing through a filter a light emitted from a light source.

11. The method of claim 10 wherein said filter is a band pass filter.

12. The method of claim 9 wherein said light comprises a light having a single wavelength.

13. The method of claim 12 wherein said light having a single wavelength is a laser light.

14. The method of claim 9 wherein said liquid crystal is dispersed in said photocurable resin by the irradiation of said light.

15. The method of claim 9 wherein said light absorption peak wavelength minus 20 nm to said light absorption peak wavelength plus 20 nm is 380 nm to 420 nm.

16. An electro-optical device comprising:
   a substrate provided with an electrode thereon; and
   an electro-optical modulating layer provided on said substrate and comprising a liquid crystal and a resin,
   wherein said resin comprises a photocurable part having a light absorption peak wavelength of 380 nm to 420 nm.

17. The device of claim 16 further comprising another substrate provided on said electro-optical modulating layer.

18. The device of claim 16 further comprising another electrode provided on said electro-optical modulating layer.

19. The device of claim 18 further comprising a protection film provided on said another electrode.

20. The device of claim 16 wherein said resin surrounds a droplet comprising said liquid crystal.

21. A method for manufacturing a liquid crystal electro-optical device comprising the steps of:
   preparing a mixture comprising a liquid crystal and a photocurable resin containing a reaction initiator; and
   curing said photocurable resin by irradiating said mixture with a light emitted from a light source,
   wherein a filter is placed in a light path between said mixture and said light source in order to selectively pass a light which is to be absorbed by said reaction initiator.

22. The device of claim 21 wherein the light after passing through said filter is such that at least 90% of the light has a wavelength which is within ±20 nm of the light absorption peak wavelength of the reaction initiator in the resin.

23. The device of claim 21 wherein said light source is a mercury lamp.

* * * * *